United States Patent [19]

Urasaki et al.

[11] 4,436,894
[45] Mar. 13, 1984

[54] NOVEL WHOLLY AROMATIC COPOLYESTER, PROCESS FOR PRODUCTION THEREOF, AND FILM MELT-SHAPED THEREFROM

[75] Inventors: Takanori Urasaki, Hino; Yasuji Hirabayashi, Hachioji; Tugusi Yoshida; Hiroo Inata, both of Hino, all of Japan

[73] Assignee: Teijin Limited, Osaka, Japan

[21] Appl. No.: 286,855

[22] Filed: Jul. 27, 1981

[30] Foreign Application Priority Data

Jul. 31, 1980 [JP] Japan .............................. 55-104361
Oct. 23, 1980 [JP] Japan .............................. 55-147548
Oct. 24, 1980 [JP] Japan .............................. 55-148143

[51] Int. Cl.³ .................... C08G 63/18; C08G 63/60
[52] U.S. Cl. ................................. 528/176; 264/290.2; 528/125; 528/126; 528/128; 528/173; 528/179; 528/193; 528/194
[58] Field of Search ............... 528/125, 126, 128, 173, 528/176, 193, 154, 179

[56] References Cited

U.S. PATENT DOCUMENTS 4,064,108 12/1977 Inata et al. .......................... 528/193
4,102,864 7/1978 Deex et al. .......................... 528/193
4,118,372 10/1978 Schaefgen .......................... 528/193

*Primary Examiner*—Lester L. Lee
*Attorney, Agent, or Firm*—Sherman and Shalloway

[57] ABSTRACT

A wholly aromatic copolyester composed mainly of isophthalic acid units and hydroquinone units, the total proportion of said isophthalic acid units and hydroquinone units being at least about 80 mole % based on the entire units, said wholly aromatic copolyester having a terminal carboxyl group concentration, measured by the method described in the specification, of not more than about 90 eq/$10^6$ g and a reduced viscosity, determined at 35° C. in a mixed solvent of phenol and tetrachloroethane in a weight ratio of 4:6 in a concentration of 1.2 g/dl of at least about 0.6 and being substantially linear and melt-shapable and substantially free from a halogen atom bonded to the molecular chain, and a film prepared therefrom by melt shaping.

23 Claims, No Drawings

NOVEL WHOLLY AROMATIC COPOLYESTER, PROCESS FOR PRODUCTION THEREOF, AND FILM MELT-SHAPED THEREFROM

This invention relates to a novel wholly aromatic copolyester, a process for production thereof, and a film melt-shaped from the copolyester. More specifically, it relates to a wholly aromatic copolyester composed of isophthalic acid units and hydroquinone units as main repeating units, a process for production thereof, and a film melt-shaped from the copolyester.

A homo- or copolymer composed of the following recurring units

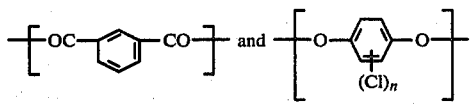

wherein n is 0, 1 or 2, has previously been known as a wholly aromatic polyester composed of isophthalic acid units and hydroquinone units as main recurring units (see U.S. Pat. No. 3,160,605). The U.S. Patent states that this homo- or copolymer is produced by polycondensing an isophthaloyl halide and a dihydric phenol in a specified high-boiling heat medium while evolving hydrogen halide. The Patent also describes the shapability of the resulting polymer into a film by a press-forming method, etc.

U.S. Pat. No. 3,036,990 describes a polymer composed of recurring units of the following formulae

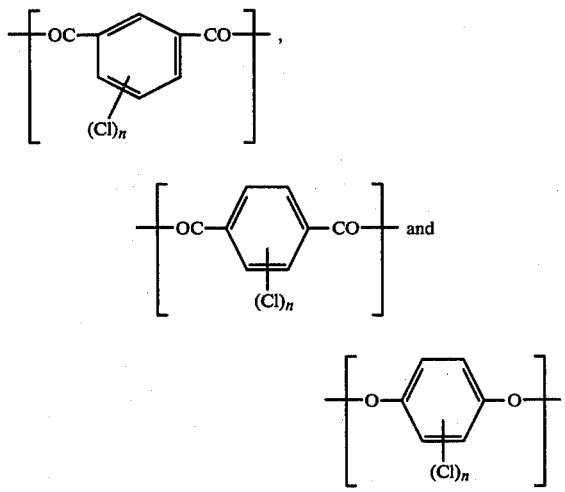

wherein n is 0, 1 or 2.

The specification of this U.S. Patent states that this polymer is produced by reacting an acid halide and a dihydric phenol in a high-boiling heat medium, or by reacting the corresponding acid and a bis(monobasic acid) ester, such as the diacetate, of a dihydric phenol in a high-boiling heat medium (solvent) under heat. The Patent also describes the shapability of the polymer into a film.

Wholly aromatic polyesters containing isophthalic acid units and hydroquinone units are also disclosed in U.S. Pat. Nos. 3,036,991, 3,036,992, 3,160,603, and 3,160,602. According to these Patents, the wholly aromatic polyesters are produced by reacting the corresponding dihydric phenol and acid halide in a heat medium, or reacting the corresponding acid and a bis(monobasic acid) ester of a dihydric alcohol in a heat medium at an elevated temperature. The specification of these patents also describe films prepared from these polyesters.

The methods described in the above U.S. Patents which involve the use of heat media can only give wholly aromatic polyesters which have many carboxyl groups or contain halogen atoms bonded to the molecular chain, and therefore have low heat stability or wet heat stability (resistance to wet heat). According to the methods involving the use of acid halides, vigorous generation of the hydrogen halides within short periods of time is inevitable, and it is necessary to take measures against the consequent operational danger. If the hydrogen halide is allowed to be generated gradually by raising the temperature slowly, a low-molecular-weight polymer separates and settles in the reaction system and its degree of polymerization does not increase.

Japanese Laid-Open Patent Publication No. 54252/1978 discloses a process for producing a shaped article of a polyester which comprises melt-shaping at a temperature of 280° to 450° C. a polyester having an intrinsic viscosity of 0.2 to 0.8 obtained by the reaction of at least one compound selected from the group consisting of terephthalic acid, isophthalic acid and the aryl esters of these acids with a dihydroxybenzene. In a working example in this Patent Publication, a polyester having an intrinsic viscosity of 0.40 is produced by heating 0.4 mole of diphenyl isophthalate, 0.286 mole of hydroquinone and 0.122 mole of resorcinol at 280° to 330° C. for 2.5 hours in an atmosphere of nitrogen, and then heating them at 350° C. under reduced pressure for 80 minutes.

This polyester presumably comprises at least about 85 mole%, based on the entire units, of isophthalic acid units and hydroquinone units. Investigations of the present invention, however, show that when the polycondensation reaction is performed, as in the above example, at a temperature higher (about 25° C. higher in this case) than the crystalline melting point (the crystalline melting point of a polymer having the above composition is about 325° C.), a substantially linear polymer cannot be obtained but only a branched dark brown polymer results.

The example of the above-cited Japanese Laid-Open Patent Publication No. 54252/1978 discloses that undrawn fibers obtained from the polyester having an intrinsic viscosity of 0.40 have an elongation of 10%, and when these undrawn fibers are heat treated at constant length, the elongation decreases to 2%. These elongation values are much lower than the elongation of undrawn fibers obtained from a substantially linear polyester.

U.S. Pat. No. 3,637,595 claims a moldable, film-forming or coating-forming polyester having a molecular weight in the range from 3,500 to 72,000 and a melting or softening point of at least 492° F., consisting essentially of recurring moieties of Formulas I, II and III:

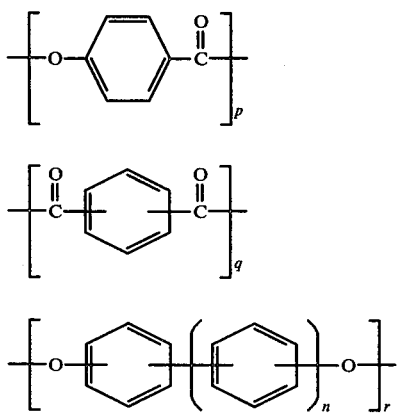

wherein n is 0 or 1; q:r=10:15 to 15:10; p:q=1:100 to 100:1; p+q+r=30 to 600; the carbonyl group of the moiety of Formula I or II is linked to the oxy group of a moiety of Formula I or III; the oxy group of the moiety of Formula I or III is linked to the carbonyl group of the moiety of Formula I or II; the carbonyl groups of the moiety of Formula II are meta or para to each other; and the oxy groups of the moiety of Formula III are meta or para to each other.

Although this U.S. Patent claims a polyester in which p+q+r=30 to 600 (which, according to its disclosure, corresponds to a molecular weight of 500 to 72,000), working examples do not describe molecular weights (working examples of the corresponding Japanese Patent Publication No. 47870/1972 disclose the corresponding polyesters have a molecular weight of about 2350 to about 4100). Furthermore, the patent discloses a polymer containing isophthalic acid units [corresponding to formula (II) in which the carbonyl groups are meta to each other] and hydroquinone units [corresponding to formula (III) in which n is 0 and the oxy groups are para to each other], in which the total proportion of these units is only 20 to about 66 mole% based on the entire units.

In addition, all of the polymers in the examples of this patent are produced by substantially heating diphenyl esters of dicarboxylic acids, phenyl hydroxybenzoate and dihydric phenols in a heat medium.

Investigations of the present inventors have shown, as the aforesaid working examples in fact describe, that when the method of polycondensation involving using a heat medium, is employed, it is difficult in practice to obtain a substantially linear polymer having a reduced viscosity of at least about 0.5, especially a substantially linear polymer having a reduced viscosity of at least about 0.5 in which the total proportion of isophthalic acid units and hydroquinone units is at least about 80% of the entire units.

U.S. Pat. No. 3,975,487 discloses highmodulus fibers composed of an oxybenzoyl copolyester having nearly the same composition as that disclosed in the above-cited U.S. Pat. No. 3,637,595. The method for producing the oxybenzoyl copolyester disclosed in this U.S. Patent comprises polycondensing hydroxybenzoic acid and a dihydric phenol as an acetate ester. The use of such acetate only leads to a copolyester having many terminal carboxyl groups.

Thus, methods of polycondensation using heat media are predominant in the prior art. More recently, there has been proposed a process for the production of a wholly aromatic polyester by bulk polycondensation which comprises a step of producing monomers, a step of producing a powdery prepolymer under a high shearing force and a step of producing a high-molecular-weight polymer from the powdery prepolymer (see Japanese Laid-Open Patent Publications Nos. 46287/1979, 46291/1979, 94930/1980, and 94935/1980). Since this process consists of three steps and requires a high shearing force, different considerations from the prior art must be given to the operation and apparatus.

It is an object of this invention to provide a novel wholly aromatic copolyester, particularly a substantially linear wholly aromatic copolyester having a high degree of polymerization and containing at least 80 mole%, based on the entire units, of isophthalic acid units and hydroquinone units.

Another object of this invention is to provide a novel wholly aromatic copolyester having low terminal carboxyl group concentrations and being substantially free from a halogen atom bonded to the molecular chain.

Still another object of this invention is to provide a novel wholly aromatic copolyester which is melt-shapable and has excellent shapability under melt-shaping conditions.

Still another object of this invention is to provide a novel wholly aromatic copolyester having excellent melt film-formability which has a flow index in the range of about 0.7 to about 0.9 and does not substantially contain a branched chain.

Still another object of this invention is to provide a novel wholly aromatic copolyester having excellent heat stability and wet heat stability.

Still another object of this invention is to provide a novel wholly aromatic copolyester having crystallinity and an improved color which is clear pale brown.

Still another object of this invention is to provide a melt polycondensation process for producing at a relatively low temperature a novel high-molecular-weight substantially linear copolyester composed of the aforesaid recurring units and having a reduced carboxyl group concentration, and a solid-phase polycondensation process to be subsequently carried out.

Still another object of this invention is to provide a film having heat resistance, particularly instantaneous heat resistance, which is produced by melt-shaping from the aforesaid novel wholly aromatic copolyester of the invention.

Still another object of this invention is to provide a film having excellent solvent resistance, for example trichloroethylene, which is produced by melt-shaping from the aforesaid wholly aromatic copolyester of the invention.

Still another object of the invention is to provide a film having improved mechanical properties, in particular improved strength and Young's modulus, which is produced from the aforesaid novel wholly aromatic copolyester of the invention.

Still another object of this invention is to provide a film having excellent dimensional stability, especially at a high temperature of, for example, 260° C., which is produced from the novel wholly aromatic copolyester of the invention.

Still another object of this invention is to provide a process for producing the film of the invention by melt-shaping from the novel wholly aromatic copolyester of the invention.

According to one aspect, these objects and advantages of the invention are achieved by a wholly aromatic copolyester composed mainly of isophthalic acid units and hydroquinone units, the total proportion of said isophthalic acid units and hydroquinone units being at least about 80 mole% based on the entire units, said wholly aromatic copolyester having a terminal carboxyl group concentration, measured by the method described in the specification, of not more than about 90 eq/10$^6$ g and a reduced viscosity, determined at 35° C. in a mixed solvent of phenol and tetrachloroethane in a weight ratio of 4:6 in a concentration of 1.2 g/dl, of at least about 0.6 and being substantially linear and melt-shapable and substantially free from a halogen atom bonded to the molecular chain.

According to the invention, the wholly aromatic copolyester is produced by (1) a process which comprises polycondensing under heat in the presence of a polycondensation catalyst a reaction mixture consisting of a major proportion of a diaryl ester of isophthalic acid and hydroquinone and a minor proportion of at least one other component selected from diaryl esters of aromatic dicarboxylic acids other than isophthalic acid, aromatic dihydroxy compounds other than hydroquinone and aryl hydroxybenzoates while intermittently or continuously removing the hydroxyaryl compound formed, and after the reduced viscosity of the polymer formed in the reaction system has reached about 0.2, performing the polycondensation at a temperature lower than the crystalline melting point of the polymer while maintaining the reaction system in a molten condition (to be referred to as a process 1); or (2) a process which comprises polycondensing under heat in the presence of a polycondensation catalyst a reaction mixture consisting of a major proportion of isophthalic acid, hydroquinone and a diaryl carbonate and a minor proportion of at least one other component selected from aromatic dicarboxylic acids other than isophthalic acid, aromatic dihydroxy compounds other than hydroquinone, hydroxybenzoic acid, and aryl hydroxybenzoates while intermittently or continuously removing the hydroxyaryl compound and carbon dioxide formed, and after the reduced viscosity of polymer formed in the reaction system has reached about 0.2, performing the polycondensation at a temperature lower than the crystalline melting point of the polymer while maintaining the reaction system in a molten condition (to be referred to as a process 2).

Process 1

The starting material used in process 1 is a reaction mixture which consists mainly of a diaryl isophthalate and hydroquinone and contains a third component which can be ester-interchanged with these main components.

The third component is a diaryl ester of an aromatic dicarboxylic acid other than the diaryl isophthalate, an aromatic dihydroxy compound other than hydroquinone, or an aryl hydroxybenzoate.

Examples of the diaryl ester of an aromatic dicarboxylic acid as the third component are diaryl esters of terephthalic acid, naphthalene-2,6-dicarboxylic acid, naphthalene-2,7-dicarboxylic acid, diphenyl-4,4'-dicarboxylic acid and diphenyl ether-4,4'-dicarboxylic acid. They may be, for example, phenyl esters of these dicarboxylic acids, naphthyl esters of these carboxylic acids, and alkylsubstituted phenyl esters of these carboxylic acids such as the tolyl, dimethylphenyl, ethylphenyl, propylphenyl and butylphenyl esters.

The aromatic dihydroxy compounds as the third component may include bisphenols of the following formula

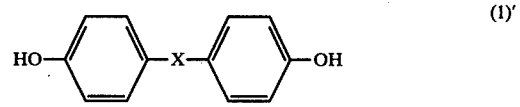

wherein X is —O—, >C=O or

in which $R^1$ and $R^2$ are identical or different and each represents a hydrogen atom, a methyl group, an ethyl group or a phenyl group, or $R^1$ and $R^2$, taken together with the carbon atom to which they are bonded, may form a cyclohexane ring;

substituted hydroquinones of the following formula

wherein $R^3$ represents a tertiary alkyl group having 4 to 9 carbon atoms, or a phenyl group which may be substituted by a tertiary butyl group;

and substituted or unsubstituted resorcinols of the following formula

wherein $R^4$ represents a hydrogen atom, a tertiary alkyl group having 4 to 9 carbon atoms, or a phenyl group which may be substituted by a tertiary butyl group.

Examples of preferred bisphenols of formula (1)' are 2,2-bis(4-hydroxyphenyl)propane, 2,2-bis(4-hydroxyphenyl)butane, bis(4-hydroxyphenyl)methane, bisphenylbis(4-hydroxyphenyl)methane, 1,1-bis(4-hydroxyphenyl)cyclohexane, di(4-hydroxyphenyl)ether, and di(4-hydroxyphenyl)ketone. Among these, the 2,2-bis(4-hydroxyphenyl)propane and di(4-hydroxyphenyl)ester are especially preferred.

In formula (2)', $R^3$ represents a tertiary alkyl group having 4 to 9 carbon atoms, or a phenyl group which may be substituted by a tertiary butyl group. The tertiary alkyl group having 4 to 9 carbon atoms denotes butyl, pentyl, hexyl, heptyl and octyl groups whose carbon at the alpha-position is tertiary.

Examples of preferred substituted hydroquinones of formula (2)' are (tertiary butyl)hydroquinone, (tertiary pentyl)hydroquinone, (tertiary octyl)hydroquinone, phenylhydroquinone, and (4-tertiary butyl phenyl)hydroquinone. The (tertiary butyl)hydroquinone is especially preferred.

Specific examples of the tertiary alkyl group having 4 to 9 carbon atoms for $R^4$ in formula (3)' are the same as those given hereinabove for $R^3$.

Examples of preferred substituted or unsubstituted resorcinols of formula (3)' are resorcinol, 4-tertiary butyl resorcinol, 4-tertiary pentyl resorcinol, 4-tertiary octyl resorcinol, 4-phenyl resorcinol and 4-(4-tertiary butyl phenyl) resorcinol. Resorcinol is especially preferred.

A preferred example of the aryl hydroxybenzoate as the third component is a compound of the following formula

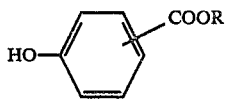 (4)' wherein R represents an aryl group, such as a phenyl group, a naphthyl group, or an alkyl-substituted phenyl group (e.g., tolyl, dimethylphenyl, ethylphenyl, propylphenyl or butylphenyl), and the COOR group is meta or para to the HO group.

Specific examples of preferred compounds of formula (4)' are phenyl p-hydroxybenzoate, tolyl p-hydroxybenzoate, ethylphenyl p-hydroxybenzoate, phenyl m-hydroxybenzoate, tolyl m-hydroxybenzoate and naphthyl m-hydroxybenzoate. Among these, phenyl p-hydroxybenzoate and phenyl m-hydroxybenzoate are especially preferred.

In the process 1 of the invention, a mixture consisting of a major proportion of the diaryl isophthalate and hydroquinone and a minor proportion of at least one third component is used as a starting material.

Examples of preferred diaryl isophthalates are diphenyl isophthalate, ditolyl isophthalate, di(ethylphenyl) isophthalate, di(propylphenyl) isophthalate, and di(butylphenyl) isophthalate. Among them, diphenyl isophthalate is especially preferred because it is easily available commercially, is easy to handle and has good reactivity and one (phenol) of the compounds formed as a result of the reaction can be easily removed from the reaction system.

According to the process 1, the reaction mixture consisting of the diaryl isophthalate, hydroquinone and at least one third component is heated in the presence of a polycondensation catalyst. A reaction medium should not substantially be present in the reaction system, and therefore, the reaction proceeds in the molten state.

The amounts of the three components in the reaction mixture are such that the ratio of the hydroxyl groups to the aryl ester groups is from about 1:1 to about 1:1.2, preferably from about 1:1 to about 1:1.1. A polymer containing at least about 80 mole%, based on the entire units, of isophthalic acid units and hydroquinone units in the molecular chain can be obtained by using a starting reaction mixture containing at least about 80 mole % of the diaryl isophthalate and hydroquinone combined in which the amount of the hydroxyl groups is at least equimolar to the aryl ester groups.

When a mixture consisting of diphenyl isophthalate, hydroquinone and 2,2-bis(4-hydroxyphenyl)propane is used as a starting material, the reaction proceeds so as to form units of the following formulae

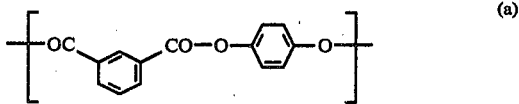

and

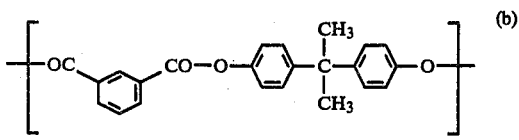

while forming phenol.

As shown by the above reaction, a hydroxyaryl compound such as phenol is formed during the formation of the polymer chain by the reaction. The hydroxyaryl compound formed is intermittently or continuously removed from the reaction mixture. Preferably, the hydroxyaryl compound is removed continuously.

Generally, the reaction begins at a temperature of about 200° C. The reaction temperature can be raised continuously or stepwise. Preferably, at least until the reduced viscosity of the resulting polymer formed in the reaction system reaches 0.08, the reaction temperature is higher than the crystalline melting point of the polymer. The characteristic feature of process 1 is that after the reduced viscosity of the resulting polymer has reached about 0.2, the reaction temperature is maintained lower than the crystalline melting point of the polymer while the reaction system is maintained in the molten state. The reaction system can be maintained in the molten state despite the fact that the reaction temperature is lower than the crystalline melting point of the polymer. This is because the rate of crystallization of the polymer is slow at a temperature below the crystalline melting point of the polymer. The rate of crystallization depends upon the composition of a given polymer. Accordingly, the time during which the aforesaid molten condition can be maintained after the reduced viscosity of the polymer has reached about 0.2 varies with the polymer. Generally, this period can be maintained longer as the amount of the third component is larger or when the bisphenol of formula (1)' is used as the third component. At the longest, this state can be maintained until the reduced viscosity of the polymer reaches about 0.6 to about 0.8.

Preferably, the reaction temperature is finally brought to about 320° to about 330° C. at the highest. This temperature generally corresponds to a temperature which is about 20° to about 60° C. lower than the crystalline melting point of the resulting polymer.

A polymer containing terminal carboxyl groups in a low concentration can be produced by performing the polycondensation at a temperature lower than the crystalline melting point of the polymer after the reduced viscosity of the polymer has reached about 0.2.

Generally, the reaction is carried out at atmospheric pressure in the initial stage, and then under reduced pressure or in an inert gas while forcibly removing the resulting hydroxyaryl compound and hydroquinone used in excess or another dihydroxy compound. Preferably, at least when the reduced viscosity of the polymer formed in the reaction system reaches about 0.1, the reaction system is forcibly placed under conditions which lead to elimination of the hydroxyaryl compound, etc., especially under reduced pressure. Desirably, in the reaction under atmospheric pressure, about 50 to about 70%, based on the theoretical amount, of the hydroxyaryl compound is removed.

In performing the reaction under reduced pressure, the reaction pressure is relatively quickly reduced, for example to about 20 mmHg within about 1 hour, and the reaction is continued under the reduced pressure until a polymer having the desired reduced viscosity is formed. Or the degree of pressure reduction is further increased and the pressure is reduced to about 0.1 mmHg at the lowest. The reaction is continued until the desired polymer is likewise formed.

Under preferred reaction conditions, the total reaction period required for obtaining a polymer having a desired reduced viscosity (e.g., 0.6 to 0.8) can be adjusted to less than about 6 hours. In this case, the reaction time required for reaction under reduced pressure or reaction in an inert gas can be adjusted to less than about 3 hours.

The polymerization catalyst may be any known ester-interchange catalyst. Examples of the catalyst are compounds containing metals such as calcium, magnesium, strontium, barium, lanthanum, cerium, manganese, cobalt, zinc, germanium, tin, antimony and bismuth. Those which have heretofore been known as this kind of ester-interchange catalyst are preferred. Specific examples include magnesium acetate, calcium benzoate, strontium acetate, lanthanum carbonate, cerium oxide, manganese acetate, cobalt acetate, zinc acetate, germanium oxide, stannous acetate, antimony trioxide, and bismuth trioxide.

Together with the polymerization catalyst, a stabilizer may be allowed to be present in the reaction system. Examples of such a stabilizer include oxy acids of phosphorus or the esters thereof, such as phosphorous acid, phosphoric acid, trimethyl phosphate, triethyl phosphate, triphenyl phosphate and triphenyl phosphite, and phosphonic acids or the esters thereof, such as phenylphosphonic acid, benzylphosphonic acid and dimethyl phenylphosphonate.

The stabilizer is useful for improving the color of the resulting polymer, and in some cases, for inactivating the polymerization catalyst. When it is desired to inactivate the polymerization catalyst, the stabilizer is added generally to the polycondensation system in which a polymer having the desired reduced viscosity is present. When the polymerization catalyst is, for example, a compound containing antimony or germanium which undergoes little or no inactivation by the aforesaid stabilizers, the stabilizer may also be added at any desired time from the initial to the final stage of the reaction.

Process 2

The starting material used in the process 2 is a reaction mixture consisting of a major proportion of isophthalic acid, hydroquinone and a diaryl carbonate and a minor proportion of at least one other component capable of forming an ester group by reaction with the aforesaid components.

The diaryl carbonate is a compound of the following formula

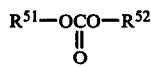  (5)

wherein $R^{51}$ and $R^{52}$ are identical or different and each represents a monovalent substituted or unsubstituted aryl group.

Examples of the unsubstituted aryl group for $R^{51}$ and $R^{52}$ are phenyl and naphthyl groups, and examples of the substituted aryl group for these symbols are alkyl-substituted aryl groups such as tolyl, dimethylphenyl, ethylphenyl, propylphenyl and butylphenyl groups.

Examples of preferred diaryl carbonates are diphenyl carbonate, ditolyl carbonate, phenyltolyl carbonate, di(ethylphenyl) carbonate, di(methylphenyl) carbonate and dinaphthyl carbonate. Diphenyl carbonate is especially preferred.

The third component is an aromatic dicarboxylic acid other than isophthalic acid, an aromatic dihydroxy compound other than hydroquinone, or hydroxybenzoic acid or an aryl hydroxybenzoate.

Examples of the other aromatic dicarboxylic acid, the other aromatic dihydroxy compound, and the aryl hydroxybenzoate may be the same as those given hereinabove with regard to the process 1. Namely, terephthalic acid, etc. are used as the aromatic dicarboxylic acid; the bisphenols of formula (1)', the substituted hydroquinones of formula (2)' and the substituted or unsubstituted resorcinols of formula (3)' are used as the aromatic dihydroxy compound; and the compounds of formula (4)' are used as the aryl hydroxybenzoate.

According to the process 2, the reaction mixture consisting of a major proportion of isophthalic acid, hydroquinone and a diaryl carbonate and a minor proportion of at least one other component is heated in the presence of a polycondensation catalyst. The polycondensation catalyst may be the same as those exemplified hereinabove with regard to the process 1. As in the process 1, the presence of a reaction medium in the reaction system should be avoided.

Isophthalic acid, hydroquinone and the other component are contained in the reaction mixture in such a proportion that the ratio of the hydroxyl groups to the carboxyl groups, or in some cases, to both the carboxyl groups and the aryl ester groups is about from about 1:1 to about 1:1.2, preferably from about 1:1 to about 1:1.1 The preferred amount of the diaryl carbonate is about 1.00 to about 1.05 moles per equivalent of the carboxyl group.

A polymer containing at least about 80 mole%, based on the entire units, of isophthalic acid units and hydroquinone units in the molecular chain can be obtained by using a reaction mixture containing at least about 80 mole%, based on the reaction mixture (excepting the diaryl carbonate), of isophthalic acid hydroquinone combined in which the amount of the hydroxyl groups is equimolar to the carboxyl groups or both the carboxyl groups and the aryl ester groups of the aryl hydroxybenzoate which may be present.

When, for example, a mixture of isophthalic acid, hydroquinone, 2,2-bis(4-hydroxyphenyl)propane and diphenyl carbonate is used as a starting material, the reaction proceeds to form the units (a) and (b) as in process 1 while forming phenol and carbon dioxide. It is believed that according to this process, a reaction of converting the carboxyl group to its phenyl ester with attendant decarboxylation, and/or a reaction of converting the hydroxyl group to a phenoxycarbonyloxy group takes place first, and then an ester interchange reaction between the resulting intermediate and the hydroxyl groups or the carboxyl groups (with attendant decarboxylation in the latter case) takes place.

As can be understood from the above reactions, according to the process 2, a hydroxyaryl compound such as phenol and carbon dioxide are formed during the formation of a polymer by the reactions. Nearly all of the hydroxyaryl compound (equimolar to the diaryl carbonate used) formed by the reaction of forming an aryl ester such as a phenyl ester and the reaction of forming the phenoxycarbonyloxy group and about 50 to about 70 mole %, based on theory, of the hydroxyaryl compound formed by the ester interchange reaction of forming the polymer chain are removed out of the reaction system in the relatively early stage of the reaction.

According to the process 2, the above reactions may be carried out by mixing all of the starting materials together. Alternatively, carboxyl-containing starting materials including isophthalic acid are first reacted with the diaryl carbonate, and then a starting material having a hydroxyl group is reacted. Those skilled in the art will understand that the latter procedure is also embraced within the present invention.

The above-mentioned differences of the process 2 from the process 1 arise in the relatively early stage of the reaction for forming the polymer, and therefore have substantially nothing to do with the reaction of substantially forming the polymer chain.

Accordingly, it will be understood that after the early stage of the reaction under atmospheric pressure, the process 2 is carried out under substantially the same reaction conditions (e.g., the temperature, the atmosphere, etc.) as described hereinabove with regard to the process 1.

According to the process 1 or 2 of the invention, a polymer having a reduced viscosity of up to about 0.8 can be produced. A polymer having a reduced viscosity higher than the polymer so produced can, according to still another aspect of the invention, be produced by subjecting the resulting polymer to solid-phase polymerization under reduced pressure or in an inert gas in a manner known per se.

The polymer to be subjected to solid-phase polymerization has a reduced viscosity of preferably at least about 0.2, especially preferably at least about 0.25.

Polymers having a reduced viscosity of at least about 0.6 obtained by the process 1 or 2 can give films having improved properties, and therefore, for use as a material for film formation, these polymers do not absolutely require solid-phase polymerization for increasing their reduced viscosities. Polymers having a reduced viscosity of less than about 0.6, however, are desirably subjected to solid-phase polymerization to increase their reduced viscosity further.

According to the process 1 or 2, such polymers having a low reduced viscosity tend to be formed when the amount of the other minor component is small, or the compound of formula (2)', (3)' or (4)' is used as the other minor component.

It is known in the solid-phase polymerization of wholly aromatic copolyesters that the desired degree of polymerization is more rapidly reached as the size of polymer particles is smaller. Accordingly, the polymer to be subjected to solid-phase polymerization usually has a particle size smaller than 5 Tyler's mesh, preferably a particle size of 6 to 300 Tyler's mesh. If the particle size is too small, the polymer undesirably lends itself to difficult pulverization or handling.

Generally, the solid-phase polymerization is carried out in an inert gas such as nitrogen at atmospheric pressure to reduced pressure, preferably at a reduced pressure of, for example, not more than 1 mmHg, at a temperature at which the wholly aromatic copolyester is maintained in the solid phase, preferably at a temperature at which the polymer particles do not agglomerate into a difficulty-separable mass, for example at a temperature lower than the flow initiation temperature (as defined hereinbelow) of the wholly aromatic copolyester and between about 250° C. and about 300° C.

The flow initiating temperature, which can be one measure of the solid-phase polymerization temperature for the wholly aromatic copolyester, can be easily determined by the method to be described hereinbelow.

According to the solid-phase polymerization method, a polymer having a further increased reduced viscosity can be obtained. For example, a polymer having a reduced viscosity of about 0.85 to about 0.95 is obtained from a polymer having a reduced viscosity of about 0.2 to about 0.25, or a polymer having a reduced viscosity of about 1.2 to 2.0, from a polymer having a reduced viscosity of about 0.4 to about 0.7.

Thus, according to the process of this invention, there is provided a wholly aromatic copolyester comprising isophthalic acid units and hydroquinone units as main recurring units in which the proportion of these units is at least about 80 mole% of the entire units, said wholly aromatic copolyester having a terminal carboxyl group concentration, measured by the method to be described below, of not more than about 90 eq/$10^6$ g and a reduced viscosity, determined at 35° C. in a mixed solvent of phenol and tetrachloroethane in a weight ratio of 4:6 in a concentration of 1.2 g/dl, of at least about 0.6 and being substantially linear and melt-shapable and being substantially free from a halogen atom bonded to the molecular chain.

Structurally, the wholly aromatic copolyester of the invention consists of isophthalic acid units of the formula

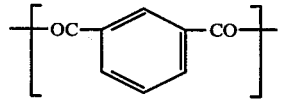

hydroquinone units of the formula

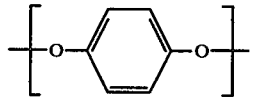

and units derived from the other minor component. The total proportion of the isophthalic acid units and the hydroquinone units is at least about 80 mole% based on the three components. The proportion of the unit of the other component is not more than about 20 mole% of the three units.

The wholly aromatic copolyester of the invention contain the isophthalic acid units and hydroquinone units in a proportion of preferably about 85 to about 95 mole%, more preferably about 87 to about 93 mole%, based on the entire units.

Preferred units derived from the other component include, for example, aromatic dicarboxylic acid units of the following formula

(6)

wherein Ar represents a divalent aromatic radical such as p-phenylene, 2,6-naphthylene, 2,7-naphthylene,

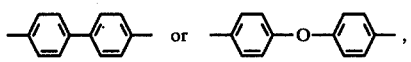

bisphenol units of the following formula

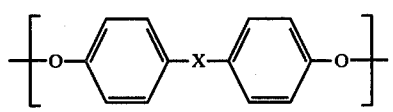 (1)

wherein X is —O—, >C=O or

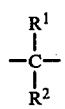

in which $R^1$ and $R^2$ are identical or different, and each represents a hydrogen atom, a methyl group, an ethyl group or a phenyl group, or $R^1$ and $R^2$, taken together with the carbon atom to which they are bonded, may form a cyclohexane ring, substituted hydroquinone units of the following formula

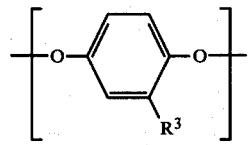 (2)

wherein $R^3$ represents a tertiary alkyl group having 4 to 9 carbon atoms, or a phenyl group which may be substituted by a tertiary butyl group, substituted or unsubstituted resorcinol units of the following formula

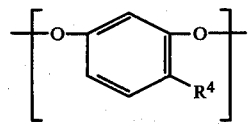 (3)

wherein $R^4$ represents a hydrogen atom, a tertiary alkyl group having 4 to 9 carbon atoms, or a phenyl group which may be substituted by a tertiary butyl group, and hydroxybenzoic acid units of the following formula

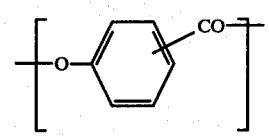 (4)

wherein —O— and —CO— is meta or para to each other.

Specific examples of the units of formulae (1) to (4) and (6) will be apparent from the specific examples of the compounds of formulae (1)' to (4)' and the aromatic dicarboxylic acids other than isophthalic acid which have been given hereinabove.

The wholly aromatic copolyester of the invention contain at least one compound as the third component which is selected from the group consisting of the compounds of formulae (1) to (4) and (6). These units are preferred in the order of the units of formula (1), the units of formula (2), the units of formula (3), the units of formula (4), and the units of formula (6).

The wholly aromatic copolyester of the invention preferably contains the bisphenol units of formula (1) and/or the substituted hydroquinone units of formula (2) and/or the resorcinol units of formula (3) as a third component, and consists substantially of the third component units, isophthalic acid units and hydroquinone units. Especially preferably, it contains the bisphenol units of formula (1) and/or the substituted hydroquinone units of formula (2) as the third component and consists substantially of the third component units, isophthalic acid units and hydroquinone units.

Specific examples of the wholly aromatic copolyester of the invention are those which consist of the following combinations of recurring units.

(1) Isophthalic acid units/hydroquinone units/2,2-bis(4-hydroxyphenyl)propane units, (2) isophthalic acid units/hydroquinone units/bis(4-hydroxyphenyl) ether units, (3) isophthalic acid units/hydroquinone units/tertiary butyl hydroquinone units, (4) isophthalic acid units/hydroquinone units/phenylhydroquinone units, (5) isophthalic acid units/hydroquinone units/resorcinol units, (6) isophthalic acid units/hydroquinone units/4-tertiary hexyl resorcinol units, (7) isophthalic acid units/hydroquinone units/p-hydroxybenzoic acid units, (8) isophthalic acid units/terephthalic acid units/hydroquinone units/2,2-bis(4-hydroxyphenyl)propane units, (9) isophthalic acid units/hydroquinone units/1,1-bis(4-hydroxyphenyl)cyclohexane units, and

(10) isophthalic acid units/hydroquinone units/m-hydroxybenzoic acid units.

The wholly aromatic polyester of the invention has a terminal carboxyl group concentration of preferably about 5 to about 70 eq/$10^6$g, more preferably about 10 to about 50 eq/$10^6$g.

The wholly aromatic copolyester of the invention has a reduced viscosity of preferably about 0.6 to about 2.0, more preferably about 0.7 to about 1.5.

The wholly aromatic copolyester provided by this invention does not substantially have a halogen atom such as chlorine or bromine bonded to the molecular chain. The halogen atom bonded to the molecular chain denotes, for example, a halogen atom at the terminal of the molecular chain, such as a halogen atom in the form of a carbonyl halide, or a halogen atom bonded to the aromatic ring of the main molecular chain, such as a halogen atom of the halobenzene ring.

The presence of a halogen atom bonded to the molecular chain means that even when the polymer is extracted with an organic solvent or re-precipitated from an organic solvent solution, the presence of a halogen atom in the polymer is clearly ascertained.

It should be understood therefore that the wholly aromatic copolyesters of the invention evidently do not include wholly aromatic copolyesters which are produced by the acid halide method by using a significant amount of a halogen containing compound as a polymer constituent. Such polymers outside the scope of the invention generally contain at least about 0.3% by weight of bonded halogen atoms.

The wholly aromatic copolyester of the invention is further characterized by being substantially linear. The substantially linear wholly aromatic copolyester in accordance with this invention has a flow index, at a shear rate of about 50 to about 500 sec$^{-1}$, of 0.7 to about 1, preferably 0.7 to 0.9, more preferably 0.75 to 0.9. The polymer disclosed in Japanese Laid-Open Patent Publication No. 54252/1978 cited at the outset of this specification which is obtained by polycondensation at a higher temperature than the crystalline melting point of the resulting polymer has a flow index of about 0.6. The polymer is more linear as its flow index approaches 1 (see Polymer Engineering and Science, Mid-May, Vol. 19, No. 6, pages 462–467, particularly page 463, 1979).

By a melt-shaping method, the wholly aromatic copolyester of the invention gives films having excellent properties.

Accordingly, in still another aspect of the invention, there is provided a process for producing a film composed of a wholly aromatic copolyester, which comprises heating the aforesaid wholly aromatic copolyester of the invention to a temperature above the temperature at which it can be melt-shaped, extruding the heated copolyester through a slit, then if desired monoaxially or biaxially stretching the extrudate, and if desired heat-setting it, and if desired heat-shrinking the film.

In extruding the wholly aromatic copolyester through a slit, the copolyester is heated to a temperature above the temperature at which it can be melt-shaped. The temperature at which the polymer can be melt-shaped differs depending upon the composition of the polymer. Preferably, it is between a point about 5° C. higher than the melting point of the polymer and a point about 50° C. higher than the melting point, and is not more than about 400° C.

Usually, the draft ratio is adjusted to about 2 to about 10.

The slit preferably has a land length (L) to width (W) ratio (L/W) of from about 5 to about 20, and a width W of about 0.5 to about 5 mm.

In melt shaping, a known slip agent for films, such as clay and Aerosil (main component: $SiO_2$), may be incorporated in the wholly aromatic copolyester. The slip agent may be added during the polycondensation reaction, or may be uniformly mixed with the polymer prior to melt-shaping.

Thus, an unstretched film composed of the wholly aromatic copolyester is obtained. The unstretched film obtained has good transparency. For example, even when it is treated in boiling water at 100° C., it retains good transparency and its dimension shows little or no change.

The unstretched film may subsequently be stretched monoaxially or biaxially. The stretching can be effected at a temperature between a point about 20° C. lower than the crystallization initiating temperature (as defined hereinbelow) and a point about 100° C. higher than the crystallization initiating temperature, preferably at about 180° to about 280° C., more preferably about 185° to about 250° C., especially preferably about 190° to about 220° C.

The stretching is carried out preferably until the refractive index of the film in the stretching direction reaches at least about 1.62 in the case of monoaxial stretching, and until the refractive index of the film in the two directions reaches at least about 1.62, preferably at least about 1.64 in the case of biaxial stretching. Stretch ratios which give such refractive indices differ from polymer to polymer. In the case of monoaxial stretching, the stretch ratio is usually about 1.5:1 to about 4:1, and in the case of biaxial stretching, it is usually about 1.5:1 to about 3.5:1. The biaxial stretching is advantageously carried out at an area ratio of about 2.8 to about 10. More preferably, the stretch ratios in the two directions are close to each other.

The biaxial stretching may be consecutive biaxial stretching by which the film is first stretched in one direction and then successively in a direction at right angles to the first direction, or by simultaneous biaxial stretching by which the film is stretched in the aforesaid two directions simultaneously.

If desired, the stretched film may then be preferably heat-set. Heat-setting is effected in order to improve its dimensional stability. Heat-setting can be carried out at a film temperature of about 250° C. to about 330° C., preferably at a temperature of about 250° C. to a point 20° C. lower than the melting point of the polymer. The time for the heat-setting is at least one second, preferably from 10 seconds to 5 minutes.

The heat-setting is performed under tension, and the crystallization of the film proceeds as a result of the heat-setting.

The heat-set film can then be subjected to heat shrinking. Heat shrinking is carried out to shrink the film in advance by heating so that it does not shrink to a great extent when later subjected to heat. The heat-shrinking can be effected at a film temperature of from about 200° C. to a temperature 20° C. lower than the melting point of the polymer, but not exceeding about 320° C. The preferred heat-shrinking temperature is about 200° C. to a temperature at least 10° C. lower than the heat-setting temperature, especially about 220° C. to a temperature at least 10° C. lower than the heat-setting temperature.

The heat shrinking can be carried out either under tension or under no tension. Shrinking under tension means what is generally called "restricted shrinking".

Desirably, the ratio of heat-shrinking is varied depending upon the maximum shrinkage of the heat-set film to be shrunken. It is especially desirable to produce a heat-set film having a maximum shrinkage (at the heat-setting temperature) of not more than about 30%, and to shrink the heat-set film until the residual shrinkage at the heat-setting temperature is not more than about 5%, preferably not more than about 2%, especially preferably not more than about 1%.

Thus, according to this invention, there is provided a film produced by melt shaping from the wholly aromatic copolyester of the invention, said wholly aromatic copolyester being characterized by having a terminal carboxyl group concentration, measured by the method described in the specification, of not more than about 90 eq/$10^6$ g, preferably 10 to 70 eq/$10^6$ g, especially preferably about 10 to about 60 eq/$10^6$ g, and a reduced viscosity, determined at 35° C. in a mixed solvent of phenol and tetrachloroethane in a weight ratio of 4:6, of at least about 0.6, and being substantially linear and substantially free from a halogen atom bonded to the molecular chain.

The film of this invention includes all of the unstretched film, stretched film (monoaxially or biaxially stretched film), heat-set film and heat-shrunken film. The film of the invention has a thickness of not more than 2,000 microns, preferably 1 to 1,000 microns, especially 5 to 500 microns.

Preferably, the film of this invention has within its plane perpendicularly crossing two directions each of which has a Young's modulus at 25° C. of at least about 70 kg/mm$^2$ and a strength at 25° C. of at least about 7 kg/mm$^2$. Particularly, the stretched film, the heat-set film and the heat-shrunken film have within the plane of the film two perpendicularly crossing directions each of which has a Young's modulus at 25° C. of at least about 150 kg mm$^2$, especially at least about 180 kg/mm$^2$ and a strength at 25° C. of at least about 10 kg/mm$^2$, especially at least about 12 kg/mm$^2$.

The heat-set film and heat-shrunken film of the present invention preferably have a linear coefficient of expansion defined by the following equation of not more than about $8 \times 10^{-5}$ mm/mm/°C., especially not more than about $6 \times 10^{-5}$ mm/mm/°C., and have excellent dimensional stability.

$$\frac{L_{260} - L_{25}}{L_{25} \times (260 - 25)}$$

wherein $L_{260}$ is the film length (mm) attained when a film sample having a length of about 100 mm and a width of about 5 mm at 25° C. is heated at 260° C. under no tension, and $L_{25}$ is the film length (mm) attained when the film used for the measurement of $L_{260}$ is allowed to cool to 25° C.

Preferably, the heat-set film and heat-shrunken film have an elongation, measured at 25° C. after it has been heat-treated at 260° C. for 60 seconds under no tension, of at least about 20%, especially at least 50%, and have excellent instantaneous heat resistance.

The films of this invention have an elongation at 25° C. of at least about 20%, preferably at least about 50%.

The unstretched film, heat-set film and heat-shrunken film of the invention preferably have a heat shrinkage (%), defined by the following formula, of not more than about 5%, especially not more than 1%, and have dimensional stability to heat shrinkage at high temperatures.

$$\frac{l_{25} - l_{260}}{l_{25}} \times 100$$

wherein $l_{25}$ is the length (mm) of a film sample at 25° C., and $l_{260}$ is the film length (cm) attained when the film sample used for the measurement of $l_{25}$ is heated at 260° C. for 60 seconds under no tension and then allowed to cool to 25° C.

The films in accordance with this invention further have a water absorption of as low as about 0.5%, and good resistance to organic solvents such as trichloroethylene.

The films of the invention obtained by melt shaping from the wholly aromatic copolyester of the invention have excellent melt stability because the wholly aromatic copolyester does not contain foreign matter (according to the polycondensation process of the invention for producing the wholly aromatic copolyester, no foreign matter which is insoluble in the polymer is formed). Accordingly, the films of the invention have excellent transparency and a smooth surface.

By utilizing their excellent heat resistance, the films of the invention can be used, for example, as films for metal vapor deposition, films for flexible printed circuits, and electrical insulating films.

The following examples illustrate the present invention more specifically.

All parts in these examples are by weight.

Testing methods and sample preparation are described below.

Preparation of Samples

1. Samples for measuring the reduced viscosity ($\eta$sp/c) and carboxyl group concentration [COOH]

The wholly aromatic copolyester of the invention is crystallizable, and, for example, a fully crystalline polymer immediately after the solid-phase polymerization is difficult to dissolve in a mixed solvent of phenol and tetrachloroethane. Thus, if the wholly aromatic copolyester is sparingly soluble, it is dried at 150° C., and about 1 g of the dried polymer is filled in a cylinder having a cross-sectional area of 1 cm$^2$ equipped with a nozzle having a diameter of 1 mm and a length of 5 mm, heated for 2 minutes at a temperature of 380° C., and extruded in filament form. Thus, samples for the measurement of the above items are prepared.

2. Samples for measurement of the melting point and flow initiating temperature

The wholly aromatic copolyester is heat-treated at 200° C. for 1 hour, and used as a sample for the measurement of the above items.

Method for Measuring the Reduced Viscosity ($\eta$sp/c)

120 mg of the sample is dissolved in a mixed solvent of phenol and tetrachloroethane in a weight ratio of 4:6, and its relative viscosity ($\eta_r$) at 35° C. was measured by means of an Ostwalt viscometer. The reduced viscosity ($\eta_{sp/c}$) was calculated from the following equation.

$$\eta_{sp/c} = (\eta_r - 1)/0.5$$

Method for Measuring the Carboxyl Group Concentration [COOH]

100 mg of the sample is dissolved in 10 ml of a mixed solvent of phenol and tetrachloroethane in a weight ratio of 4:6, and titrated with a 0.1 N benzyl alcohol solution of sodium hydroxide using bromocresol green as an indicator. [COOH] is calculated from the following equation.

$$[COOH] = \frac{[A - B] \times f}{\text{Amount (g) of the polymer}} \times 10^2 \quad (\text{eq.}/10^6 \text{ g})$$

In the above equation, A is the amount (cc) of the 0.1 N benzyl alcohol solution of sodium hydroxide reacted with the solution of the sample in the aforesaid mixed solvent of phenol and tetrachloroethane, B is the amount (cc) of the 0.1 N benzyl alcohol solution of sodium hydroxide reacted with the mixed solvent of phenol and tetrachloroethane, and f is the factor of the 0.1 N benzyl alcohol solution.

Method for Measuring the Melting Point of Polyester

The sample is heated at a rate of 10° C. using a differential thermal analysis device (Rigaku Denki Co., Ltd.; Model 8075 DI) and its melting point is determined from its peak position in a customary manner.

Method for Measurement of the Flow Initiating Temperature

About one gram of the sample is filled in a cylinder having a cross-sectional area of 1 cm$^2$ equipped with a nozzle having a diameter of 1 mm and a length of 5 mm, and then heated at a rate of 10° C./min. under a pressure of 100 kg/cm$^2$. The temperature at which the sample begins to flow from the nozzle is defined as the flow initiating temperature.

Method for Measuring the Crystallization Initiation Temperature

The unstretched film obtained by melt extrusion of the wholly aromatic copolyester is maintained at various temperatures for 1 hour. The lowest of the temperatures at which an increase in specific gravity owing to crystallization is noted is defined as the crystallization initiating temperature.

Method for Measuring the Flow Index

About 1.0 g of the polymer is filled in a cylinder having a cross-sectional area of 1 cm$^2$ equipped with a nozzle having a diameter of 1 mm and a length of 5 mm, and melt-extruded under various pressures at the melt-extrudable temperature of the polymer. The shear stress ($\tau$) and the shear rate ($\dot{\gamma}$) are calculated from the following equations.

$$\tau = \frac{RP}{2L} \text{ (dynes/cm}^2\text{)}$$

$$\dot{\gamma} = \frac{4Q}{\pi R^3} \text{ (sec}^{-1}\text{)}$$

In these equations, R is the radius (0.05 cm) of the nozzle, L is the length (0.5 cm) of the nozzle, P is the pressure (dynes/cm$^2$) during the extrusion, and Q is the flow rate (cm$^3$/sec) of the polymer from the nozzle.

Using the calculated shear stress ($\tau$) and the shear rate ($\dot{\gamma}$), the flow index (n) is calculated from the following equation.

$$\tau/\dot{\gamma}n = \text{constant}$$

The flow index (n) is obtained as the gradient of a straight line on a graph in which the abscissa is log $\dot{\gamma}$ and the ordinate is log $\tau$.

Method for Measuring the Amount of Halogen

The amount of halogen is measured by an X-ray fluorescence method using an X-ray spectrometer assembly (KG-X, an instrument made by Rigaku Denki Co., Ltd.) The calibration curve was made by adding a p-haloterephthalic acid (for example, p-chloroterephthalic acid) to the sample.

Method for Measuring the Strength, Elongation and Young's Modulus

The strength, elongation and Young's modulus of a sample film, 60 mm in length and 5 mm in width, are measured by setting the sample at a chuck length of 20 mm and elongating it in an atmosphere kept at 25° C. and a humdity of 65% at a pulling speed of 100% per minute (20 mm/min) using an Instron tensile tester Model TM-M.

Method for Measuring the Transparency

An unstretched film, 300 microns in thickness, is used as a sample, and visible light having a wavelength of 700 m$\mu$ is irradiated perpendicularly to the surface of the film. The light transmittance is measured, and evaluated.

Method for Measuring the Refractive Index

1. Refractive indices in a direction perpendicular to the film surface and in the machine direction A sample having a size of 10 mm in the machine direction and 30 mm in a direction at right angles to the machine direction is prepared, and its refractive index is measured in a customary by an Abbe's refractometer at 20° C. using sodium D rays.

2. Refractive index in a direction at right angles to the machine direction

A sample having a size of 10 mm in a direction at right angles to the machine direction and 30 mm in the machine direction, and the refractive index is measured in the same way as in the case of measuring the refractive index in the machine direction.

Method for Measuring the Shrinkage at 260° C.

A sample film, 5 mm wide and 100 mm long, is used. The shrinkage of the film sample is measured from changes in the length of the sample in the longitudinal direction is determined by the method described hereinabove.

Method for Measuring the Coefficient of Linear Expansion

The coefficient of the linear expansion is calculated by the method described in the specification on the basis of the lengths of the sample measured at 25° C. and 260° C.

EXAMPLE 1

Diphenyl isophthalate (190.80 parts), 55.44 parts of hydroquinone, 28.73 parts of 2,2-bis(4-hydroxyphenyl) propane, 0.070 part of antimony trioxide and 0.098 part of triphenyl phosphate were charged into a polymerization reactor equipped with a stirrer, and heated at 250° to 290° C. in an atmosphere of nitrogen for 2 hours. Phenol (68 parts; about 60% of theory) formed as a result of the reaction was distilled off (the reaction product in the reaction system had a reduced viscosity of 0.08 and a melting point of 280° C.).

Then, the pressure of the reaction system was gradually reduced, and simultaneously, the raising of the reaction temperature was started. Over the course of about 1 hour, the pressure was reduced to 20 mmHg and the reaction temperature was increased to 330° C. (at this time, the polymer in the reaction system had a reduced viscosity of 0.15 and a melting point of 350° C.). Under these conditions, the polymerization was continued for 30 minutes, and then after the pressure was reduced to 2 mmHg, the polymerization was continued for 15 minutes. The resulting polymer had a reduced viscosity of 0.60 and a melting point of 360° C.

The melt-polymerization was stopped, and the resulting polymer was cooled, pulverized to a size of 12 to 20 mesh, and subjected to solid-phase polymerization at 0.2 mmHg and 250° C. for 2 hours and further at 0.2 mmHg and 290° C. for 15 hours. The resulting polymer had a reduced viscosity of 0.90, a terminal carboxyl group concentration of 25 eq/$10^6$ g, and a melting point of 355° C. The polymer had a flow index at 380° C. of 0.78.

EXAMPLE 2

Diphenyl isophthalate (190.80 parts), 58.91 parts of hydroquinone, 21.55 parts of 2,2-bis(4-hydroxyphenyl)-propane, 0.105 part of antimony trioxide and 0.042 part of trimethyl phosphate were used instead of the starting materials used in Example 1, the polymerization time at 20 mmHg was changed to 15 minutes and the polymerization at 2 mmHg was not performed. Otherwise, the melt polymerization of the above materials was carried out in the same way as in Example 1.

The resulting polymer had a reduced viscosity of 0.30 and a melting point of 370° C.

The polymer was pulverized to a size of 12 to 50 mesh, and subjected to solid-phase polymerization at 0.2 mmHg and 250° C. for 2 hours and at 0.2 mmHg and 280° C. for 30 hours in the same way as in Example 1. The resulting polymer had a reduced viscosity of 0.88, a terminal carboxyl group concentration of 28 eq/$10^6$ g, and a melting point of 370° C. The polymer had a flow index at 380° C. of 0.77.

EXAMPLE 3

Diphenyl isophthalate (190.80 parts), 58.08 parts of hydroquinone, 21.91 parts of tertiary butyl hydroquinone, 0.105 part of antimony trioxide and 0.098 part of triphenyl phosphate were charged into a polymerization reactor equipped with a stirrer, and heated at 250° to 290° C. for 2 hours in an atmosphere of nitrogen. Seventy parts (about 62% of theory) of phenol formed as a result of the reaction was distilled off (the product in the reaction system had a reduced viscosity of 0.08.)

The pressure of the reaction system was then gradually reduced, and simultaneously, the raising of the reaction temperature was started. Over the course of about 1 hour, the pressure was reduced to 20 mmHg and the reaction temperature was raised to 320° C. (at this time, the product in the reaction mixture had a reduced viscosity of 0.15 and a melting point of 365° C.). Under these conditions, the polymerization was continued further for 18 minutes.

The resulting polymer had a reduced viscosity of 0.30 and a melting point of 370° C.

The melt-polymerization was then stopped. The resulting polymer was cooled, pulverized to a size of 12 to 50 mesh, and subjected to solid-phase polymerization at 0.05 mmHg and 250° C. for 2 hours and further at 0.05 mmHg and 290° C. for 28 hours. The resulting polymer had a reduced viscosity of 0.95, a terminal carboxyl group concentration of 30 eq/$10^6$ g and a melting point of 370° C. The polymer had a flow index at 380° C. of 0.75.

EXAMPLE 4

Diphenylisophthalate (190.80 parts), 58.08 parts of hydroquinone, 14.52 parts of resorcinol and 0.088 part of stannous acetate were charged into a polymerization reactor equipped with a stirrer, and heated in an atmosphere of nitrogen at 250° to 290° C. for 2 hours. Phenol (65 parts; about 58% of theory) formed as a result of the reaction was distilled off (the product in the reaction system had a reduced viscosity of 0.07). Then, the pressure of the reaction system was gradually reduced, and simultaneously, the raising of the reaction temperature was started. Over the course of about 1 hour, the pressure was reduced to 20 mmHg, and the reaction temperature was increased to 320° C. (at this time, the product in the reaction system had a reduced viscosity of 0.14 and a melting point of 350° C.). Under these conditions, the polymerization was continued for 15 minutes. The resulting polymer had a reduced viscosity of 0.31 and a melting point of 355° C. The melt-polymerization was then stopped. The resulting polymer was cooled, pulverized to a size of 12 to 50 mesh, and subjected to solid-phase polymerization at 0.1 mmHg and 250° C. for 2 hours and then at 0.1 mmHg and 290° C. for 26 hours. The resulting polymer had a reduced viscosity of 0.85. a terminal carboxyl concentration of 10 eq/$10^6$ g, and a melting point of 355° C. The polymer had a flow index at 380° C. of 0.76.

EXAMPLE 5

Diphenyl isophthalate (152.64 parts), 25.68 parts of phenyl p-hydroxybenzoate, 55.44 parts of hydroquinone, 0.070 part of antimony trioxide and 0.055 part of triethyl phosphate were charged into a polymerization reactor equipped with a stirrer, and heated in an atmosphere of nitrogen at 250° to 285° C. for 2.5 hours. Phenyl (61 parts; about 60% of theory) was distilled off (the product in the reaction system had a reduced viscosity of 0.08). Then, the pressure of the reaction system was gradually reduced and simultaneously the raising of the reaction temperature was started. Over the course of about 1 hour, the pressure was reduced to 20 mmHg and the reaction temperature was increased to 320° C. (at this time, the reaction product in the reaction system had a reduced viscosity of 0.15 and a melting point of 360° C.). Under these conditions, the polymerization was continued for 15 minutes.

The resulting polymer had a reduced viscosity of 0.35 and a melting point of 360° C.

The melt-polymerization was then stopped. The polymer obtained was cooled, pulverized to a size of 15 to 50 mesh, and subjected to solid-phase polymerization at 0.02 mmHg and 250° C. for 1 hour and then at 0.02 mmHg and 290° C. for 32 hours.

The resulting polymer had a reduced viscosity of 0.96, a terminal carboxyl group content ration of 14 eq./$10^6$ g, and a melting point of 360° C. The polymer had a flow index at 380° C. of 0.75.

EXAMPLES 6 TO 10

Each of the polymers obtained in Examples 1 to 5 was melted by an extruder and extruded from a T die having a slit width of 1.5 mm and a land length of 10 mm on to a casting drum heated at 100° C. to form an unstretched film having a thickness of about 300 microns. The film had a light brown color and good smoothness and transparency.

The unstretched film was stretched in the machine direction (MD for short) at 200° C. at each of the stretch ratios shown in Table 2. Then, at the same temperature, the film was stretched at a predetermined stretch ratio in a direction (TD for short) at right angles to the machine direction to give a biaxially stretched film. The stretched film was then heat-set at constant length at 285° C. for 10 seconds. The heat-set film was then shrunken simultaneously by the ratios shown in Table 3 in the machine direction (MD) and a direction (TD) at right angles to the machine direction at 270° C. for 20 seconds.

The properties of the unstretched film are shown in Table 1. The properties of the biaxially stretched film are shown in Table 2. The properties of the heat-set and shrunken film are shown in Table 3 together with the shrinkages of the heat-set film during the shrinking treatment in the machine direction (MD) and the transverse direction (TD).

TABLE 1

Unstretched film

| Example | Polymer obtained in | $\eta sp/c$ | [COOH] | Halogen content (ppm) | Strength (kg/mm$^2$) MD | TD | Elongation (%) MD | TD | Young's modulus (kg/mm$^2$) MD | TD | Transparency (%) |
|---|---|---|---|---|---|---|---|---|---|---|---|
| 6 | Example 1 | 0.90 | 26 | 10> | 8.0 | 7.5 | 140 | 133 | 80 | 80 | 90 |
| 7 | Example 2 | 0.87 | 29 | 10> | 7.5 | 7.3 | 80 | 125 | 80 | 86 | 90 |
| 8 | Example 3 | 0.94 | 31 | 10> | 7.5 | 7.5 | 120 | 130 | 80 | 80 | 89 |
| 9 | Example 4 | 0.84 | 12 | 10> | 7.3 | 7.4 | 97 | 80 | 112 | 132 | 88 |
| 10 | Example 5 | 0.96 | 15 | 10> | 7.8 | 8.0 | 120 | 120 | 100 | 100 | 90 |

TABLE 2

Stretched film

| Example | Stretch ratio MD | TD | Strength (kg/mm$^2$) MD | TD | Elongation (%) MD | TD | Young's modulus (kg/mm$^2$) MD | TD | Refractive index MD | TD |
|---|---|---|---|---|---|---|---|---|---|---|
| 6 | 2.5 | 2.5 | 18 | 19 | 80 | 90 | 210 | 220 | 1.65 | 1.65 |
| 7 | 2.2 | 2.2 | 18 | 16 | 70 | 70 | 220 | 230 | — | — |
| 8 | 2.0 | 2.0 | 17 | 16 | 68 | 70 | 218 | 208 | 1.66 | 1.66 |
| 9 | 2.0 | 2.0 | 18 | 16 | 70 | 70 | 220 | 220 | 1.65 | 1.64 |
| 10 | 1.8 | 1.8 | 18 | 15 | 58 | 60 | 220 | 200 | 1.69 | 1.67 |

TABLE 3

Film heat-shrunken after heat-setting

| Example | Shrinkage (%) MD | TD | Strength (kg/mm$^2$) MD | TD | Elongation (%) MD | TD | Young's modulus (kg/mm$^2$) MD | TD | Shrinkage at 260° C. (%) MD | TD | Coefficient of linear expansion ($\times 10^{-5}$ mm/mm/°C.) MD | TD |
|---|---|---|---|---|---|---|---|---|---|---|---|---|
| 6 | 5 | 10 | 14.3 (14.0) | 14.4 (14.0) | 90 (85) | 90 (85) | 210 | 210 | 0.5 | 0.5 | 4.5 | 4.0 |
| 7 | 4 | 6 | 13.5 (12.9) | 13.4 (12.8) | 75 (70) | 78 (72) | 220 | 220 | 0.5 | 0.5 | 4.3 | 4.1 |
| 8 | 2 | 4 | 13.0 (12.5) | 13.1 (12.7) | 65 (60) | 60 (56) | 200 | 210 | 0.5 | 0.6 | 4.5 | 2.9 |
| 9 | 2 | 4 | 12.5 (11.5) | 13.0 (12.0) | 37 (30) | 35 (29) | 220 | 220 | 0.5 | 0.9 | 4.0 | 4.0 |
| 10 | 6 | 10 | 13.0 (12.0) | 13.0 (12.1) | 47 (38) | 51 (41) | 220 | 210 | 0.9 | 1.4 | 2.0 | 4.5 |

(*) The parenthesized figures show the strength or elongation of the film which was maintained at 260° C. for 1 minute after the shrinking at 270° C.

In order to examine the solvent resistance of the film, the heat-set films in Examples 6 to 8 were further shrunken at 270° C. The resulting shrunken films were dipped in trichloroethylene at room temperature for 24 hours. and then withdrawn, dried at 100° C. Then, the strength and elongation of the film were measured. There was scarcely any decrease in strength and elongation which could be attributed to the treatment with trichloroethylene.

EXAMPLES 11 TO 15

Aromatic copolyesters were prepared in the same way as in Example 3 except that instead of 190.80 parts of diphenyl isophthalate, 58.08 parts of hydroquinone and 21.91 parts of tertiary butyl hydroquinone, the following starting materials were used:

(1) 190.80 parts of diphenyl isophthalate, 55.44 parts of hydroquinone, and 25.45 parts of bis(4-hydroxyphenyl)ether (Example 11);

(2) 171.72 parts of diphenyl isophthalate, 19.08 parts of diphenyl terephthalate, 62.37 parts of hydroquinone and 14.36 parts of 2,2-bis(4-hydroxyphenyl)propane (Example 12);

(3) 190.80 parts of diphenyl isophthalate, 55.44 parts of hydroquinone, and 23.44 parts of phenylhydroquinone (Example 13);

(4) 190.80 parts of diphenyl isophthalate, 55.44 parts of hydroquinone and 24.44 parts of 4-tertiary hexyl resorcinol (Example 14);

(5) 190.80 parts of diphenyl isophthalate, 55.44 parts of hydroquinone and 26.96 parts of bis(4-hydroxyphenyl)ketone (Example 15).

The resulting polymers were formed into films in the same way as in Examples 6 to 10. The unstretched films obtained were each stretched successively in the machine direction (MD) and a direction (TD) at right angles of the machine direction, heat-set at 285° C. at constant length, and shrunken at 270° C. The properties of the films are shown in Table 4.

TABLE 4

| Example | ηsp/c | [COOH] (eq/10⁶ g) | Stretch ratio MD | Stretch ratio TD | Shrinkage (%) MD | Shrinkage (%) TD | Strength (kg/mm²) MD | Strength (kg/mm²) TD | Elongation (%) MD | Elongation (%) TD | Young's modulus (kg/mm²) MD | Young's modulus (kg/mm²) TD | Shrinkage at 260° C. (%) MD | Shrinkage at 260° C. (%) TD |
|---|---|---|---|---|---|---|---|---|---|---|---|---|---|---|
| 11 | 1.05 | 25 | 2.2 | 2.2 | 4 | 6 | 14.5 (14.1) | 14.3 (14.0) | 85 (80) | 85 (81) | 220 | 220 | 0.5 | 0.5 |
| 12 | 0.98 | 24 | 2.0 | 2.0 | 3 | 5 | 13.0 (12.5) | 13.0 (12.6) | 75 (70) | 73 (69) | 220 | 220 | 0.5 | 0.7 |
| 13 | 0.85 | 28 | 2.0 | 2.0 | 5 | 7 | 13.2 (12.8) | 13.5 (12.8) | 74 (70) | 81 (75) | 210 | 210 | 0.5 | 0.5 |
| 14 | 0.95 | 21 | 2.0 | 2.0 | 2 | 4 | 12.0 (11.0) | 11.8 (11.0) | 35 (29) | 35 (30) | 200 | 200 | 0.9 | 1.0 |
| 15 | 0.88 | 22 | 2.2 | 2.2 | 3 | 5 | 13.0 (12.6) | 13.1 (12.7) | 76 (70) | 75 (71) | 190 | 210 | 0.6 | 0.6 |

(*) The parenthesized figures show the strength and elongation of the film which was maintained at 260° C. for 1 minute after the shrinking at 270° C.

The monoaxially stretched film obtained by stretching at a ratio of 2.2 in the machine direction in Example 11 had a strength of 18 kg/mm² (MD) and 7 kg/mm² (TD), an elongation of 32% (MD) and 70% (TD) and a Young's modulus of 290 kg/mm² (MD) and 110 kg/mm² (TD).

EXAMPLES 16 TO 18

The melt stability and wet heat stability of the wholly aromatic copolyesters obtained in Examples 6, 7 and 8 were examined. Examples 6 to 8 made it clear that the above wholly aromatic copolyesters gave unstretched films having good transparency and being substantially free from bubbles, etc. by melt shaping.

Each of the unstretched films obtained in Examples 6 to 8 was cut, dried at 150° C. for 24 hours, filled in a cylinder having a cross-sectional area of 1 cm² equipped with a nozzle having a diameter of 1 mm and a length of 5 mm, melted at 380° C. for 5 minutes, and extruded into filament form under a pressure of 40 kg/cm². The reduced viscosity and terminal carboxyl group concentration of the polymer were measured.

The melt stability of the above wholly aromatic copolyesters was evaluated (test A) from variations in reduced viscosity and terminal carboxyl group concentration before and after the above melting operation.

On the other hand, the unstretched films obtained in Examples 6 to 8 were each put in a glass tube together with water. The glass tube was sealed up, and then held in an autoclave at 120° C. for 24 hours. Then, the reduced viscosities of the unstretched films were measured. The wet heat stability of the wholly aromatic copolyesters was evaluated (test B) from the variations in reduced viscosity before and after this wet heat treatment operation. The results are shown in Table 5.

pane, 128.40 parts of diphenyl carbonate and 0.105 part of antimony trioxide were charged into a polymerization reactor equipped with a stirrer, and heated in an atmosphere of nitrogen at 250° to 290° C. for 3 hours. Phenol (124 parts; corresponding to the sum of the moles of the phenyl carbonate used and 60% of the theoretical amount in moles of phenol formed by ester-interchange reaction for forming a polymer chain) was distilled off (the product in the reaction system had a reduced viscosity of 0.08 and a melting point of 275° C.). Then, nitrogen was introduced into the reaction mixture to forcibly distill off the phenol formed as a result of the reaction out of the reaction system, and simultaneously, over the course of about 1 hour, the reaction temperature was raised to 330° C. and the pressure of the reaction system was reduced to 20 mmHg. Under these conditions, the polymerization was continued for 30 minutes. The resulting polymer had a reduced viscosity of 0.45 and a melting point of 355° C. The melt-polymerization was then stopped. The resulting polymer was cooled, pulverized to a size of 15 to 24 mesh, and subjected to solid-phase polymerization at 0.01 mmHg and 250° C. for 1 hour and then at 0.02 mmHg and 290° C. for 20 hours.

The resulting polymer had a reduced viscosity of 0.91, a terminal carboxyl group concentration of 23 eq./10⁶ g The polymer had a flow index at 380° C. of 0.77. It was confirmed that the polymer could be formed into films as can the polymer of Example 1.

What we claim is:

1. A wholly aromatic copolyester composed mainly of isophthalic acid units and hydroquinone units, the total proportion of said isophthalic acid units and hydroquinone units being at least about 80 mole% based on the entire units, said wholly aromatic copolyester

TABLE 5

| Example | Unstretched film obtained in | Before testing ηsp/c | Before testing [COOH] (eq/10⁶ g) | After test A ηsp/c | After test A [COOH] (eq/10⁶ g) | After test B ηsp/c |
|---|---|---|---|---|---|---|
| 16 | Example 6 | 0.90 | 26 | 0.85 (94) | 38 | 0.68 (76) |
| 17 | Example 7 | 0.87 | 29 | 0.83 (95) | 39 | 0.68 (78) |
| 18 | Example 8 | 0.94 | 31 | 0.89 (95) | 40 | 0.71 (70) |

(*) The parenthesized figures show the ratio (%) of ηsp/c of the sample after the test to that of the sample before testing.

EXAMPLE 19

Isophthalic acid (99.60 parts), 55.44 parts of hydroquinone, 28.73 parts of 2,2-bis(4-hydroxyphenyl)prohaving a terminal carboxyl group concentration, measured by dissolving the wholly aromatic copolyester in a mixed solvent of phenol and tetrachloroethane in a weight ratio of 4:6 and titrating the resulting solution with a benzyl alcohol solution of sodium hydroxide using bromocresol green as an indicator, of not more than about 90 eq/$10^6$ g and a reduced viscosity, determined at 35° C. in a mixed solvent of phenol and tetrachloroethane in a weight ratio of 4:6 in a concentration of 1.2 g/dl of at least about 0.6 and being substantially linear and melt-shapable and substantially free from a halogen atom bonded to the molecular chain.

2. The wholly aromatic copolyester of claim 1 wherein the total proportion of the isophthalic acid units and hydroquinone units is about 85 to about 95 mole% of the entire units.

3. The wholly aromatic copolyester of claim 1 or 2 which is composed substantially of the isophthalic acid units and hydroquinone units and at least one type of units selected from the group consisting of bisphenol units of the following formula

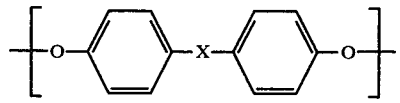

wherein X is —O—, >C=O or

in which $R^1$ and $R^2$ are identical or different and each represents a hydrogen atom, a methyl group, an ethyl group or a phenyl group, or $R^1$ and $R^2$ taken, together with the carbon atom to which they are bonded, may form a cyclohexane ring, substituted hydroquinone units of the following formula

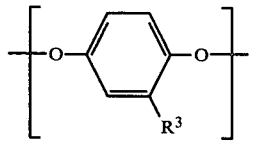

wherein $R^3$ represents a tertiary alkyl group having 4 to 9 carbon atoms or a phenyl group which may be substituted by a tertiary butyl group, substituted or unsubstituted resorcinol units of the following formula

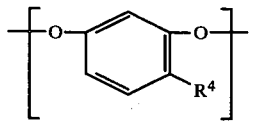

wherein $R^4$ represents a hydrogen atom, a tertiary alkyl group having 4 to 9 carbon atoms, or a phenyl group which may be substituted by a tertiary butyl group, and hydroxybenzoic acid units of the following formula

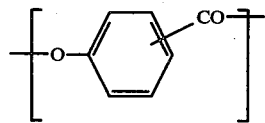

wherein —O— and —CO— are meta or para to each other.

4. The wholly aromatic copolyester of claim 3 which consists substantially of isophthalic acid units, hydroquinone units, and the bisphenol units of formula (1) and/or the substituted hydroquinone units of formula (2).

5. The wholly aromatic copolyester of claim 1 which has a terminal carboxyl group concentration of about 5 to about 70 eq./$10^6$ g.

6. The wholly aromatic copolyester of claim 1 which has a reduced viscosity of about 0.7 to about 210.

7. The wholly aromatic copolyester of claim 1 wherein a halogen atom bonded to the molecular chain is a halogen atom at the terminal of the molecular chain, or a halogen atom bonded to the aromatic ring in the molecular chain.

8. The wholly aromatic copolyester of claim 1 which has a flow index, at a shear rate of about 50 to about 500 sec$^{-1}$ of 0.7 to 0.9 on an average.

9. A process for producing the wholly aromatic copolyester defined in claim 1 or a wholly aromatic copolyester having a reduced viscosity of less than about 0.6, which comprises polycondensing under heat in the presence of a polycondensation catalyst a reaction mixture consisting of a major proportion of a diaryl ester of isophthalic acid and hydroquinone and a minor proportion of at least one other component selected from diaryl esters of aromatic dicarboxylic acids other than isophthalic acid, aromatic dihydroxy compounds other than hydroquinone and aryl hydroxybenzoates while intermittently or continuously removing the hydroxyaryl compound formed, and after the reduced viscosity of the polymer formed in the reaction system has reached about 0.2, performing the polycondensation at a temperature lower than the crystalline melting point of the polymer while maintaining the reaction system in a molten condition.

10. A process for producing the wholly aromatic copolyester defined in claim 1 or a wholly aromatic copolyester having a reduced viscosity of less than about 0.6, which comprises polycondensing under heat in the presence of a polycondensation catalyst a reaction mixture consisting of a major proportion of isophthalic acid, hydroquinone and a diaryl carbonate and a minor proportion of at least one other component selected from aromatic dicarboxylic acids other than isophthalic acid, aromatic dihydroxy compounds other than hydroquinone, hydroxybenzoic acid and aryl hydroxybenzoates while intermittently or continuously removing the hydroxyaryl compound and carbon dioxide formed, and after the reduced viscosity of the polymer formed in the reaction system has reached about 0.2, performing the polycondensation at a temperature lower than the crystalline melting point of the polymer while maintaining the reaction system in a molten conditions.

11. The process of claim 9 or 10 wherein when the reduced viscosity of the polymer formed in the reaction system has reached about 0.08, the reaction system is under reduced pressure.

12. The process of claim 9 or 10 wherein at least until the reduced viscosity of the polymer formed in the reaction system reaches about 0.15, the polycondensation is carried out at a temperature higher than the crystalline melting point of the polymer.

13. A process for producing the wholly aromatic copolyester defined in claim 1 whose reduced viscosity has been enhanced, which comprises polymerizing the wholly aromatic copolyester defined in claim 1 or a wholly aromatic copolyester having a reduced viscosity of less than about 0.6 in the solid phase at a temperature of from 250° C. to 300° C. under reduced pressure or while passing an inert gas into the reaction system.

14. A film prepared by melt shaping from a wholly aromatic copolyester composed mainly of isophthalic acid units and hydroquinone units, said wholly aromatic copolyester comprising at least about 80 mol%, based on the entire units, of the isophthalic acid units and hydroquinone units, said copolyester having a terminal carboxyl group concentration, measured by dissolving the wholly aromatic copolyester in a mixed solvent of phenol and tetrachloroethane in a weight ratio of 4:6 and titrating the resulting solution with a benzyl alcohol solution of sodium hydroxide using bromocresol green as an indicator, of not more than about 90 eq per $10^6$ g and a reduced viscosity, determined at 35° C. in a mixed solvent of phenol and tetrachloroethane in a weight ratio of 4:6 in a concentration of 1.2 g/dl, of at least about 0.6 and being substantially linear and substantially free from a halogen atom bonded to the molecular chain.

15. The film of claim 14 which is unstretched.

16. The film of claim 14 which is stretched.

17. The film of claim 16 which is biaxially stretched.

18. The film of (claims 14, 15, 16 or 17) which has within its plane two perpendicularly crossing directions each of which has a Young's modulus of at least about 70 kg/mm$^2$ and a strength of at least about 7 kg/mm$^2$ at 25° C.

19. The film of claim 14, 16, or 17 which has a coefficient of linear expansion, defined by the following formula, of not more than about $8 \times 10^5$ mm/mm/°C.

$$\frac{L_{260} - L_{25}}{L_{25} \times (260 - 25)}$$

wherein $L_{260}$ is the film length (mm) attained when a film sample having a length of about 100 mm and a width of about 5 mm at 25° C. is heated at 260° C. under no tension, and $L_{25}$ is the film length (mm) attained when the film used in the measurement of $L_{260}$ is allowed to cool to 25° C.

20. The film of (claims 14, 15, 16 or 17) which has a heat shrinkage (%), defined by the following formula, of not more than about 5%:

$$\frac{l_{25} - l_{260}}{l_{25}} \times 100$$

wherein $l_{25}$ is the length (cm) of the film at 25° C., and $l_{260}$ is the film length (cm) attained when the film sample used for the measurement of $l_{25}$ is heated at 260° C. for 60 seconds under no tension and then allowed to cool to 25° C. The film of claim 20 which has a heat shrinkage of not more than about 1%.

21. The film of claim 20 which has a heat shrinkage of not more than about 1%.

22. The film of claim 14 which has an elongation at 25° C. of at least about 20%.

23. The film of claim 22 which has an elongation at 25° C. of at least about 20% when heat-treated at 260° C. for 60 seconds under no tension.

* * * * *

UNITED STATES PATENT AND TRADEMARK OFFICE
CERTIFICATE OF CORRECTION

PATENT NO. : 4,436,894
DATED : March 13, 1984
INVENTOR(S) : TAKANORI URASAKI, ET AL.

It is certified that error appears in the above—identified patent and that said Letters Patent is hereby corrected as shown below:

Claim 14, Column 29, line 22, change "80 mol %" to --- 80 mole % ---

Claim 19, Column 30, line 8, change "$8 \times 10^5$" to --- $8 \times 10^{-5}$ ---

Claim 20, Column 30, lines 31 and 32, cancel "The film of Claim 20 which has a heat shrinkage of not more than about 1%."

Signed and Sealed this

Ninth Day of October 1984

[SEAL]

Attest:

Attesting Officer

GERALD J. MOSSINGHOFF
Commissioner of Patents and Trademarks